United States Patent [19]

Ogawa et al.

[11] 4,444,926

[45] Apr. 24, 1984

[54] METHOD OF HARDENING GELATIN AND PHOTOGRAPHIC MATERIALS PRODUCED THEREBY

[75] Inventors: Masasi Ogawa; Kunio Ishigaki; Kiyotaka Hori, all of Kanagawa, Japan

[73] Assignee: Fuji Photo Film Co., Ltd., Kanagawa, Japan

[21] Appl. No.: 320,028

[22] Filed: Nov. 10, 1981

[30] Foreign Application Priority Data

Nov. 10, 1980 [JP] Japan ................................ 55-157947

[51] Int. Cl.[3] ........................ G03C 1/30; C08L 89/00; B01J 13/02

[52] U.S. Cl. ..................................... 524/23; 252/316; 106/125; 430/621; 430/622; 430/623; 430/626; 430/640

[58] Field of Search ............................ 524/17, 22, 23; 252/316; 106/125; 430/135, 137, 138, 230, 451, 495, 621, 622, 623, 626, 627, 630, 639, 640, 642

[56] References Cited

U.S. PATENT DOCUMENTS

| | | | |
|---|---|---|---|
| 3,017,280 | 1/1962 | Yudelson | 106/125 |
| 3,118,766 | 1/1964 | Roth | 260/117 |
| 3,811,897 | 5/1974 | Babbit et al. | 524/23 |
| 3,926,869 | 12/1975 | Horie et al. | 524/22 |
| 4,294,921 | 10/1981 | Yamaguchi et al. | 524/22 |

FOREIGN PATENT DOCUMENTS

| | | | |
|---|---|---|---|
| 53-39119 | 4/1978 | Japan | 524/23 |

OTHER PUBLICATIONS

*Research Disclosure,* vol. 176, pp. 22–28 (1978).

*Primary Examiner*—John Kight, III
*Assistant Examiner*—Nathan M. Nutter
*Attorney, Agent, or Firm*—Sughrue, Mion, Zinn, Macpeak & Seas

[57] ABSTRACT

A method of hardening gelatin is described which uses (1) a polymer containing at least 0.01 mol % of a repeating unit represented by formula (I)

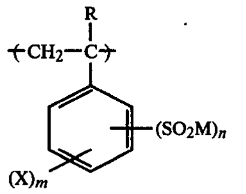

(I)

wherein R represents a hydrogen atom, an alkyl group having from 1 to 6 carbon atoms, or a halogen atom, M represents a hydrogen atom, an alkali metal atom, an alkaline earth metal atom, or an organic base, X represents an alkyl group having from 1 to 6 carbon atoms, an alkoxy group having from 1 to 6 carbon atoms, an alkylamino group having from 1 to 6 carbon atoms, or a halogen atom, m represents 0, 1 or 2, and n represents 1 or 2, (2) a polyvalent alcohol having at least two hydroxy groups, and (3) a hardener having an active vinyl group.

The method has advantages in that the rate of hardening the gelatin is fast, the so-called post hardening property is small, and the gelatin composition is hardely influenced by the conditions of temperature and humidity during storage.

52 Claims, No Drawings

METHOD OF HARDENING GELATIN AND PHOTOGRAPHIC MATERIALS PRODUCED THEREBY

FIELD OF THE INVENTION

The present invention relates to a silver halide photographic light-sensitive material and, more particularly, to a silver halide photograhic light-sensitive material in which the rate of hardening of an emulsion layer and the temperature and humidity dependency of the degree of hardening during storage are improved without adverse affects on the photographic properties by the use of a new combination of a hardener and a hardening aid.

BACKGROUND OF THE INVENTION

Gelatin is used as a binder for various photographic light-sensitive materials such as a silver halide emulsion layer, an emulsion protective layer, a filter layer, an interlayer, an antihalation layer, a backing layer, a film base subbing layer, and a baryta layer, and all these layers contain gelatin as a primary component.

These gelatin-containing photographic light-sensitive materials are treated with various aqueous solutions having different pHs and/or temperatures. Those layers which contain gelatin yet to be treated with a hardener depend primarily upon the physical properties of gelatin and are low in water resistance. In aqueous solutions, they swell excessively and become very weak in mechanical strength, and in extreme cases, the gelatin layer may dissolve out into the aqueous solution having a temperature higher than 30° C. or in a strong alkaline aqueous solution. These defects are fatal to the use of the gelatin layer as a constituent of a photographic light-sensitive material.

Many compounds have been known to be effective in hardening gelatin to provide a gelatin layer having high resistance to water, heat, and physical injury. These compounds are so-called "gelatin hardeners" and conventionally used in the production of photographic light-sensitive materials. Illustrative gelatin hardeners include aldehyde compounds such as formaldehyde and glutaraldehyde; compounds having reactive halogen as described in U.S. Pat. No. 3,633,718; compounds having a reactive ethylenically unsaturated bond as described in U.S. Pat. No. 3,635,718; aziridine compounds as described in U.S. Pat. No. 3,017,280; epoxy compounds as described in U.S. Pat. No. 3,091,537; halogenocarboxyaldehydes such as mucochromic acid; dioxanes such as dihydroxydioxane and dichlorodioxane; vinyl sulfones as described in U.S. Pat. Nos. 3,642,486 and 3,687,707; vinyl sulfone precursors as described in U.S. Pat. No. 3,841,872; keto-vinyls as described in U.S. Pat. No. 3,640,720; or inorganic hardeners such as chrome alum and zirconium sulfate.

However, these known gelatin hardeners are defective in one way or another. Some of them do not exhibit adequate hardening effect when used in a photographic light-sensitive material; others require a long time for hardening gelatin; still others are made of compounds that are difficult to synthesize, and cannot be synthesized in great quantities; other hardeners are unstable and do not keep long; some smell so bad that their production efficiency is very low; still others are harmful to the human body.

Hardeners providing a particularly high hardening rate are required to have high reactivity, and thus unavoidably they have several defects. For one thing, due to their high reactivity, they are unstable and have a tendency to decompose during their synthesis, and, for this reason, they are difficult to synthesize in great quantities. For another, highly reactive hardeners easily react with moisture in air and do not keep long. They also decompose rapidly in an aqueous solution or aqueous dispersion in which they are used, and this reduces the amount of the hardener effective for the reaction of hardening, and the desired degree of hardening may not be obtained. In addition, such hardeners, their starting materials, and intermediates generally seem to have harmful effects on the human body, such as carcinogenicity and skin-irritating effects.

However, on the other hand, the technology for achieving rapid hardening of the gelatin-containing layer of a photographic light-sensitive material is important to the photographic industry. It is known that the degree to which the gelatin-containing layer is hardened often has a critical effect on the photographic characteristics of that layer. Therefore, in the photographic industry, light-sensitive materials can be sold to the consumer only after they have been subjected to a hardening reaction to provide stable photographic characteristics. This means that the manufacturer of photosensitive materials must keep their product in stock until it is completely hardened. The cost of storage is very high, and the longer the time required for hardening, the greater the storage cost. Some manufacturers have tried to increase the hardening rate of photosensitive materials on storage by means such as heating or humidifying. However, such treatment has not been altogether satisfactory because it causes a decrease in sensitivity and the formation of fog in the photographic silver halide gelatin emulsion layer, or adhesion occurs between a front surface and a back surface in the roll of photographic light-sensitive material. Many known hardeners have a low activity, and thus they require a long period of time in order to reach the sufficiently stable state of hardening. Such a hardening reaction extended over a long period of time is called as post-hardening, and this is particularly harmful. Therefore, although a hardening technique having a fast rate of hardening gelatin without post-hardening and which is not substantially influenced by the conditions of temperature and humidity during storage has long been desired in the industry, it has been difficult to meet this demand by modifying a gelatin hardener per se.

SUMMARY OF THE INVENTION

Therefore, an object of the present invention is to provide a hardening technique having a fast hardening rate and a low post-hardening property, and which is not substantially influenced by the conditions of temperature and humidity during storage.

Other objects of the present invention will become apparent from the following detailed description and examples.

The objects of this invention can be achieved by a method of hardening gelatin which uses (1) a polymer having a repeating unit represented by formula (I)

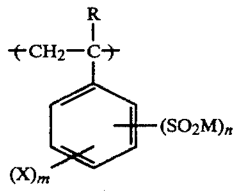

(I)

wherein R represents a hydrogen atom, an alkyl group having from 1 to 6 carbon atoms such as a methyl group or an ethyl group, or a halogen atom such as a chlorine atom or a bromine atom; M represents a hydrogen atom, an alkali metal atom such as a sodium atom or a potassium atom, an alkaline earth metal atom such as a calcium atom or a magnesium atom, or an organic base such as triethylamine; X represents an alkyl group having from 1 to 6 carbon atoms, an alkoxy group having from 1 to 6 carbon atoms, an alkylamino group having from 1 to 6 carbon atoms, or a halogen atom; m represents 0, 1 or 2; and n represents 1 or 2; (2) a polyvalent alcohol having at least two hydroxy groups; and (3) a hardener having an active vinyl group.

In another embodiment, the present invention relates to a photographic material containing at least one hardened gelatin-containing layer hardened by the combined use of (1) a polymer containing at least 0.01 mol% of a repeating unit represented by formula (I)

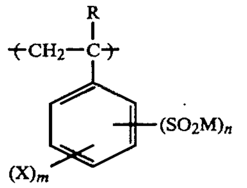

(I)

wherein R represents a hydrogen atom, an alkyl group having from 1 to 6 carbon atoms, or a halogen atom; M represents a hydrogen atom, an alkali metal atom, an alkaline earth metal atom, or an organic base; X represents an alkyl group having from 1 to 6 carbon atoms, an alkoxy group having from 1 to 6 carbon atoms, an alkylamino group having from 1 to 6 carbon atoms, or a halogen atom; m represents 0, 1 or 2; and n represents 1 or 2; (2) a polyvalent alcohol having at least two hydroxy groups; and (3) a hardener having an active vinyl group.

DETAILED DESCRIPTION OF THE INVENTION

The polymer having a repeating unit of the formula (I) above used in the present invention includes a homopolymer produced by polymerizing a monomer of formula (II) below, a copolymer produced by polymerizing a monomer of formula (II) with a monomer having at least one other addition-polymerizable unsaturated bond, and a polymer produced by introducing a sulfinic group at side chains of polymers obtained by polymerization, as well as derivatives of such polymers.

The monomer of formula (II) is represented as

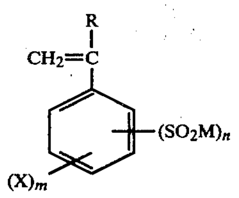

(II)

wherein R represents a hydrogen atom, an alkyl group having from 1 to 6 carbon atoms such as a methyl group or an ethyl group, or a halogen atom such as a chlorine atom or a bromine atom; M represents a hydrogen atom, an alkali metal atom such as a sodium atom or a potassium atom, an alkaline earth metal atom such as a calcium atom or a magnesium atom, or an organic base such as trimethylamine or triethylamine; X represents an alkyl group having from 1 to 6 carbon atoms, an alkoxy group having from 1 to 6 carbon atoms, an alkylamino group having from 1 to 6 carbon atoms, or a halogen atom; m represents 0, 1 or 2; and n represents 1 or 2.

Specific examples of the monomers represented by formula (II) include:

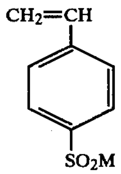

(A)

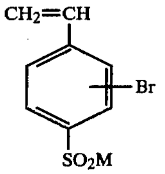

(B)

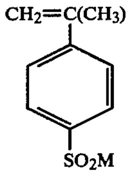

(C)

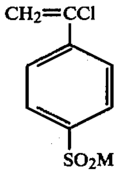

(D)

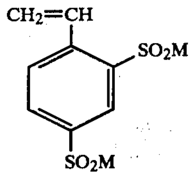

(E)

and a particularly preferred monomer is a compound of (A). The monomer (A) can be synthesized by the method described in *Chemistry Letters*, pp. 419–420 (1976), although the synthesis of the monomer is not limited to that particular method. The other monomers can be synthesized by that same basic method, or by reduction with a reducing agent such as sodium sulfite, followed by optional vinyl formation, of the corresponding sulfonic acid chloride.

A polymer such as polystyrene may be used as a starting material to produce a polymer having a repeating unit of the formula (I) in the same sulfinic group-introducing method described above.

Any monomer that has at least one addition-polymerizable unsaturated bond can be used as the monomer copolymerizable with the monomer of formula (II). Such addition-polymerizable unsaturated compounds include allyl compounds such as allyl esters (e.g., allyl acetate, allyl caproate, etc.); vinyl ethers (e.g., methyl vinyl ether, butyl vinyl ether, hexyl vinyl ether, decyl vinyl ether, ethylhexyl vinyl ether, methoxyethyl vinyl ether, ethoxyethyl vinyl ether, chloroethyl vinyl ether, 1-methyl-2,2-dimethylpropyl vinyl ether, 2-ethylbutyl ether, hydroxyethyl vinyl ether, diethylene glycol vinyl ether, dimethylaminoethyl vinyl ether, butylaminoethyl vinyl ether, benzyl vinyl ether, tetrahydrofurfuryl vinyl ether, vinyl phenyl ether, vinyl tolyl ether, vinyl chlorophenyl ether, vinyl-2,4-dichlorophenyl ether, vinyl naphthyl ether, etc.); vinyl esters (such as vinyl acetate, vinyl propionate, vinyl butyrate, vinyl isobutyrate, vinyl dimethyl propionate, vinyl ethyl butyrate, vinyl chloroacetate, vinyl dichloroacetate, vinyl methoxyacetate, vinyl phenyl acetate, vinyl acetoacetate, vinyl-β-phenylbutyrate, vinylcyclohexylcarboxylate, vinyl benzoate, vinyl salicylate, vinyl chlorobenzoate, etc.); vinyl heterocyclic compounds (such as N-vinyl oxazolidone, N-vinylimidazole, N-vinylpyrrolidone, N-vinylcarbazole, vinyl thiophene, N-vinylethyl acetamide, etc.); styrenes (e.g., styrene, methylstyrene, dimethylstyrene, ethylstyrene, isopropylstyrene, butylstyrene, hexylstyrene, cyclohexylstyrene, benzylstyrene, chloromethylstyrene, trifluoromethylstyrene, acetoxymethylstyrene, methoxystyrene, 4-methoxy-3-methylstyrene, dimethoxystyrene, chlorostyrene, dichlorostyrene, trichlorostyrene, bromostyrene, iodostyrene, fluorostyrene, 2-bromo-4-trifluoromethylstyrene, methyl vinylbenzoate ester, etc.); crotonic acids (such as crotonic acid, crotonic acid amide, crotonate ester (e.g., butyl crotonate, etc.)); vinyl ketones (e.g., methyl vinyl ketone, etc.); olefins (e.g., dicyclopentadiene, ethylene, propylene, 1-butene, 1-pentene, 1-hexene, 4-methyl-1-pentene, 1-heptene, 1-octene, 5,5-dimethyl-1-octene, 4-methyl-1-hexene, 5-methyl-1-hexene, 4-methyl-1-heptene, 5-methyl-1-heptene, 4,4-dimethyl-1-hexene, etc.); itaconic acids (e.g., itaconic acid, methyl itaconate, etc.); other acids such as sorbic acid, cinnamic acid, methyl sorbate, citraconic acid, chloroacrylic acid mesaconic acid, maleic acid, fumaric acid, and ethacrylic acid; halogenated olefins (e.g., vinyl chloride, vinylidene chloride, etc.); unsaturated nitriles (e.g., acrylonitrile, etc.); acrylic acids (such as acrylic acid, methyl acrylate, etc.); methacrylic acids (such as methacrylic acid, methyl methacrylate, etc.); and acrylamides and methacrylamides.

Of these addition-polymerizable unsaturated compounds, styrenes, vinyl heterocyclic compounds, vinyl ethers, vinyl esters and olefins are particularly preferred.

The polymer that can be used in this invention must contain at least 0.01 mol%, preferably at least 0.1 mol%, more preferably at least 1 mol%, of the repeating unit represented by formula (I). If the polymer contains less than 0.01 mol% of the repeating unit represented by formula (I), it is not capable of accelerating the hardening rate of gelatin. The intended objects of this invention can be obtained by using at least one of the above polymers in an amount of from about 0.01 to 99 wt%, preferably from 0.1 to 50 wt %, and more preferably from 1 to 20 wt %, based on the sum of the solid content of gelatin and the polymer. The polymer used in too small an amount is not very effective, and using an excessive amount of the polymer undesirably increases the viscosity of coating solution, and this may result in difficult application of the solution or gelatin, which does not set properly. The polymers defined above preferably have a molecular weight of from about 1,000 to 2,000,000, and more preferably from about 10,000 to 500,000. Polymer having too low a molecular weight is not very effective, and using a polymer having an excessively high molecular weight may undesirably increase the viscosity of the coating solution.

Illustrative polymers that can be used in the present invention are set forth below, wherein the proportions of constituent monomers are indicated in terms of the molar ratio.

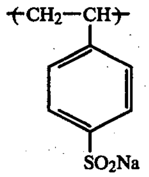

(P-1)

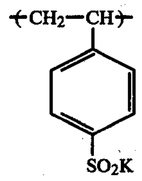

(P-2)

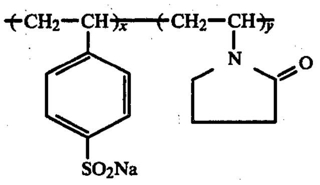

(P-3)

x/y = 80/20

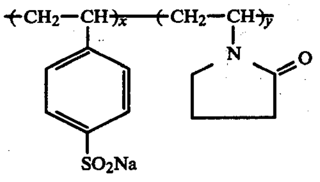

(P-4)

x/y = 50/50

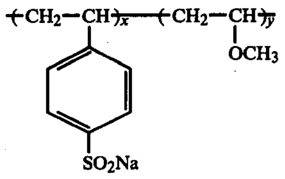

(P-5)

x/y = 50/50

-continued (P-6)

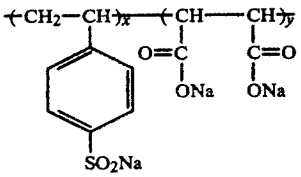

x/y = 50/50

(P-7)

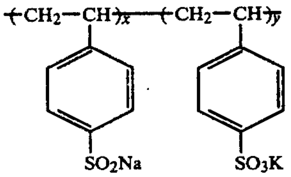

x/y = 75/25

(P-8)

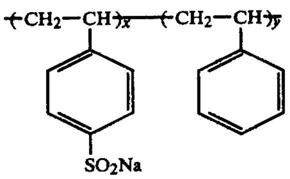

x/y = 70/30

(P-9)

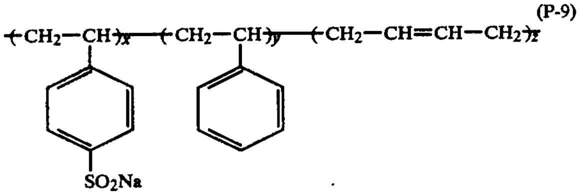

x/y/z = 50/20/30

(P-10)

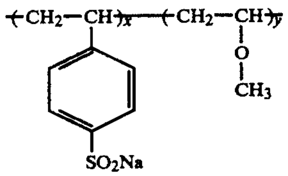

x/y = 60/40

(P-11)

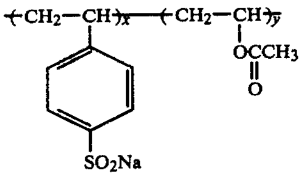

x/y = 80/20

(P-12)

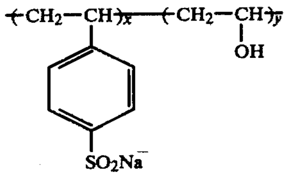

x/y = 80/20

-continued (P-13)

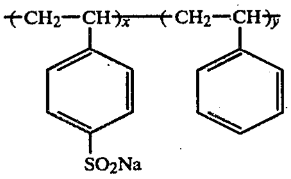

x/y = 5/95

(P-14)

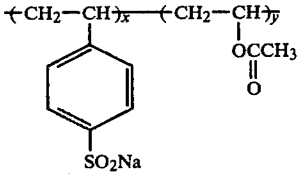

x/y = 10/90

The polyvalent alcohol which can be used in the present invention is preferably a saturated alcohol which contains from 2 to 12 hydroxy groups and from 2 to 20 carbon atoms. Representative examples of such alcohols include ethylene glycol, 1,2-propanediol, 1,3-propanediol, 1,3-butanediol, 2,3-butanediol, 1,4-butanediol, 2,3-butanediol, 1,4-butanediol, 2,2-dimethyl-1,3-propanediol, 2-methyl-2-propyl-1,3-propanediol, 1,5-pentanediol, 2-methyl-2,4-pentanediol, 2-methyl-2,4-pentanediol, 2,2,4-trimethyl-1,3-pentanediol, 1,6-hexanediol, 1,7-heptanediol, 2,5-dimethyl-2,5-hexanediol, 2-ethyl-1,3-hexanediol, dipropylene glycol, 1,2-cyclopentanediol, 1,4-cyclohexanediol, glycerol, trimethylol propane, trimethylol ethane, trimethylol hexane, 1,2,4-butanetriol, 1,2,6-hexanetriol, pentaerythritol, adonitol, sorbitol, mannitol, etc.

The amount of the above-described polyvalent alcohol used is not particularly limited, but if the amount used is too large, the surface of the photographic light-sensitive material becomes hygroscopic and causes defects such as "blocking" (adhesion of layers of material). The amount used is preferably from about 0.1 to 50 wt %, and more preferably from about 1 to 20 wt %, based on the amount of dry gelatin.

With respect to the method for addition, the polyvalent alcohol and the hardener may be added to a coating solution (a gelatin-containing coating solution) containing the polymer of formula (I) followed by coating the coating solution. Also, the polyvalent alcohol and/or the hardener may be added to a coating solution (a gelatin-containing coating solution) not containing the polymer of the formula (I) followed by coating the coating solution and, then, the polyvalent alcohol and the hardener are subjected to diffusion in the coated layers.

Any hardener having an active vinyl group can be used in the present invention. Examples of the hardeners which can be used include those described, for example, in Japanese Patent application (OPI) Nos. 41221/78, 57257/78 and 126124/76 (the term "OPI" as used herein refers to a "published unexamined Japanese patent application"), Japanese Patent Publication No. 13563/74, Japanese Patent application (OPI) Nos. 44164/76 and 21059/77, U.S. Pat. Nos. 3,490,911 and 3,539,644, Japanese Patent Publication No. 35807/75, Japanese Patent application (OPI) Nos. 30022/79 and 66960/78, Japanese Patent Publication Nos. 46495/77 and 8736/72, U.S. Pat. Nos. 3,635,718 and 3,640,720, West German Pat. No. 872,153, etc.

Typical specific examples of the hardeners having an active vinyl group which can be used in the silver halide photographic light-sensitive material according to the present invention are set forth below.

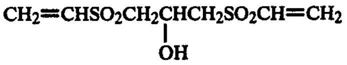

(V-1)

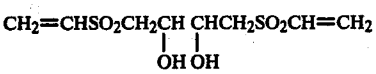

(V-2)

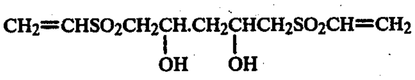

(V-3)

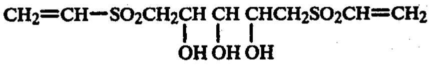

(V-4)

$(CH_2=CH-SO_2CH_2CONH)_2$ (V-5)

$(CH_2=CH.SO_2CH_2CONH)_2CH_2$ (V-6)

$(CH_2=CHSO_2CH_2CONHCH_2)_2$ (V-7)

$(CH_2=CHSO_2CH_2CONHCH_2)_2CH_2$ (V-8)

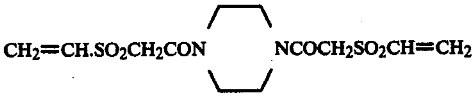

(V-9)

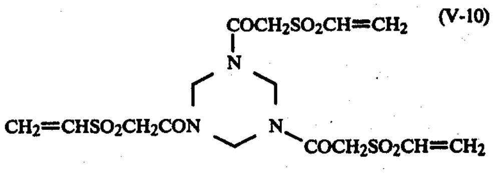

(V-10)

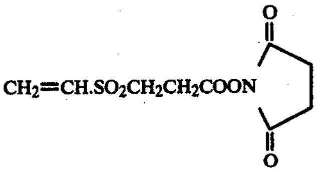

(V-11)

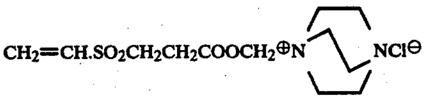

(V-12)

$CH_2=CHSO_2CH_2SO_2CH=CH_2$ (V-13)

$CH_2=CH.SO_2CH_2CH_2SO_2CH=CH_2$ (V-14)

$CH_2=CH.SO_2CH_2CH_2CH_2SO_2CH=CH_2$ (V-15)

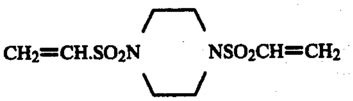

(V-16)

$C_2H_5-C(CH_2SO_2CH=CH_2)_3$ (V-17)

(V-18)

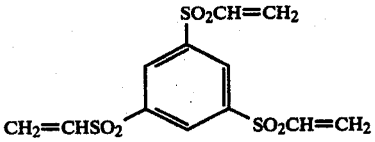

(V-19)

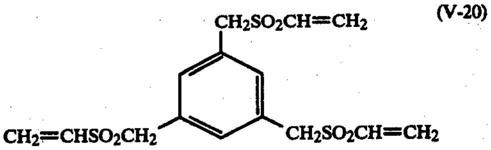

(V-20)

$(CH_2=CHSO_2CH_2)_4C$ (V-21)

(V-22)

$(CH_2=CHSO_2CH_2)_3CCH_2SO_2CH_2CH_2NHCH_2CH_2SO_3Na$

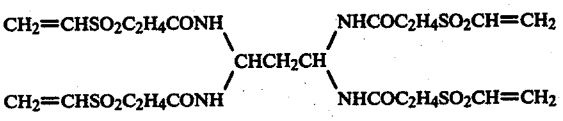

(V-23)

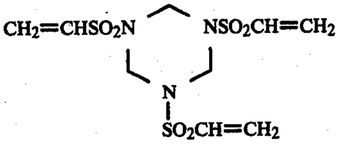

(V-24)

(V-25)

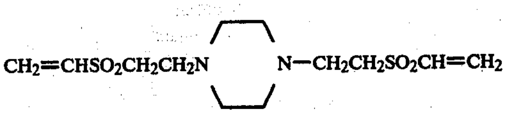

(V-26)

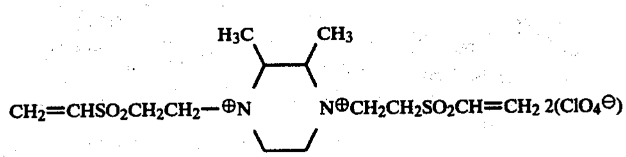

-continued

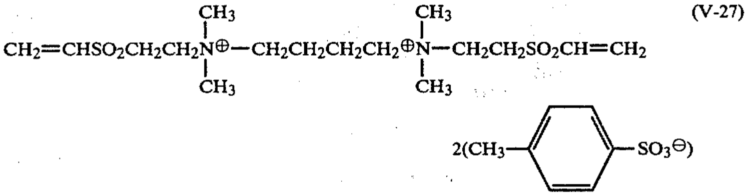 (V-27)

$CH_2{=}CHSO_2CH_2CH_2SO_2CH_2CH_2SO_2CH{=}CH_2$ (V-28)

$CH_2{=}CHSO_2CH_2CH_2OCH_2CH_2NHCONHCH_2CH_2OCH_2CH_2SO_2CH{=}CH_2$ (V-29)

$CH_2{=}CHSO_2CH_2CH_2OCH_2CH_2OCH_2CH_2SO_2CH{=}CH_2$ (V-30)

$CH_2{=}CHSO_2CH_2OCH_2SO_2CH{=}CH_2$ (V-31)

$CH_2{=}CHSO_2CH_2CH_2OCH_2CH_2SO_2CH{=}CH_2$ (V-32)

$CH_2{=}CHSO_2CH_2CH_2CH_2CH_2OCH_2CH_2CH_2CH_2SO_2CH{=}CH_2$ (V-33)

$(CH_2{=}CH.SO_2CH_2CH_2CONH)_2CH_2$ (V-34)

$(CH_2{=}CH{-}SO_2CH_2CH_2CONH.CH_2)_2$ (V-35)

$(CH_2{=}CH{-}SO_2CH_2CH_2CONHCH_2)_2CH_2$ (V-36)

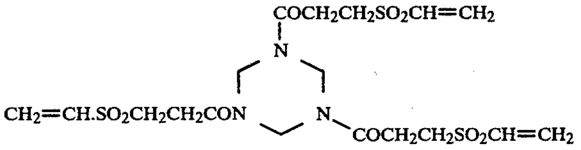 (V-37)

$CH_2{=}CHSO_2CH{=}CH_2$ (V-38)

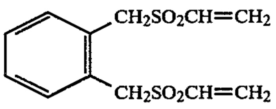 (V-39)

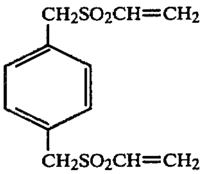 (V-40)

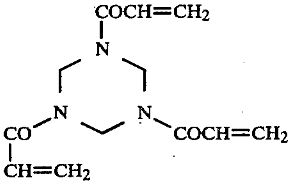 (V-41)

 (V-42)

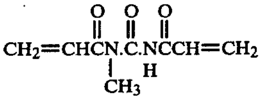 (V-43)

The gelatin hardener can be used in various amounts, depending upon the particular purposes. Generally, the hardener can be used in an amount of from about 0.01 to 20 wt % of dry gelatin. Preferably, it is used in an amount of from about 0.1 to 10 wt % of dry gelatin. If the hardener is used in an amount greater than about 20 wt % based on the weight of dry gelatin, an aqueous solution of gelatin may gel and set, making it particularly difficult to shape the aqueous solution, e.g., into a film by a coating technique such as spray coating. If the content of the hardener is less than about 0.01 wt %, it is possible to make a film of the aqueous gelatin solution, but the resulting film does not harden adequately even upon drying, and its strength is not satisfactory. When used in an amount in the range defined above, the hardener of this invention achieves its intended effect, i.e., quick hardening of gelatin.

The gelatin used in this invention may be alkali-treated (lime-treated) gelatin or acid-treated gelatin, which is prepared by immersion in an alkali bath or an acid bath before extraction. Alternatively, an enzyme-treated gelatin of the type described in *Bull. Soc. Sci. Photo. Japan*, No. 16, p. 30 (1966) may be used. Gelatin of low molecular weight which is partially hydrolyzed by heating in a water bath or by treatment with a protease may also be used.

Part of the gelatin used in this invention can be optionally replaced by colloidal albumin, casein, a cellulose derivative such as carboxymethyl cellulose or hydroxyethyl cellulose, a sugar derivative such as agar, sodium alginate or a starch derivative, a synthetic hydrophilic colloid such as polyvinyl alcohol, poly-N-vinyl pyrrolidone, polyacrylic acid copolymer or polyacrylamide or derivatives or partial hydrolyzates thereof. Alternatively, the gelatin may be partially replaced with a gelatin derivative which is obtained by treating and modifying the intramolecular functional amino, imino, hydroxyl or carboxyl group with a reagent having one group that is capable of reacting with such functional groups. A portion of the gelatin may also be replaced with a graft polymer wherein gelatin is bound with the molecular chain of another polymeric substance. Examples of the reagent for making the above gelatin derivative include isocyanates, acid chlorides or acid anhydrides as described in U.S. Pat. No. 2,614,928, acid anhydrides as described in U.S. Pat. No. 3,118,766, bromoacetic acid as described in Japanese Patent Publication No. 5514/64, phenylglycidyl ethers as described in Japanese Patent Publication No. 26845/67, vinyl sulfone compounds as described in U.S. Pat. No. 3,132,945, N-allyl-vinylsulfonamides as described in British Pat. No. 861,414, maleimide compounds as described in U.S. Pat. No. 3,186,846, acrylonitriles as described in U.S. Pat. No. 2,594,293, polyalkylene oxides as described in U.S. Pat. No. 3,312,553, epoxy compounds as described in Japanese Patent Publication No. 26845/67, acid esters as described in U.S. Pat. No. 2,763,639, and alkane sultones as described in British Pat. No. 1,033,189.

This invention is very useful as a method of hardening gelatin, and it can be used with particular advantage as a method of hardening the gelatin in a gelatin-containing layer of a silver halide photographic sensitive material. Examples of the gelatin-containing layer include a silver halide emulsion layer, a surface protective layer, an interlayer, a filter layer, an antihalation layer, a subbing layer, and a backing layer.

The silver halide emulsion used in this invention is usually prepared by mixing the solution of a water-soluble silver salt (e.g., silver nitrate) with the solution of a water-soluble halogen salt (e.g., potassium bromide) in the presence of the solution of a water-soluble polymer, e.g., gelatin. Examples of the suitable silver halide include silver chloride, silver bromide and mixed silver halides such as silver chlorobromide, iodobromide and chloroiodobromide. These photographic emulsions are described in such publications as Mees, *The Theory of Photographic Process,* Macmillan & Co. and P. Glafikides, *Chimie Photographique,* Paul Montel (1957).

These photographic emulsions may incorporate therein various additives to prevent a drop in sensitivity or fog from occurring in the production, storage or processing of a photosensitive material. A great many compounds are known as these additives, and they include 4-hydroxy-6-methyl-1,3,3a,7-tetraazaindene, 3-methylbenzothiazole, 1-phenyl-5-mercaptotetrazole, various hererocyclic compounds, mercury-containing compounds, mercapto compounds and metal salts. Some specific examples of the suitable compound are mentioned in K. Mees, *The Theory of the Photographic Process,* 3rd Ed., pp. 344–349 (1966) by reference to the papers which first reported such compounds.

When the polymer of this invention is used in a photographic sensitive material, the photographic emulsion layer and other layers may incorporate therein one or more synthetic polymer compounds, such as a water-dispersed vinyl polymer of a latex type (such as polyalkyl acrylate), that increase the dimensional stability of the photographic material. These compounds may be used in combination with hydrophilic water-permeable colloids.

The polymer of this invention can be used in a photographic sensitive material together with a matting agent, e.g., fine particles of a water-insoluble organic or inorganic compound having an average size (diameter of cross-sectional dimension) of from about 0.2 to 10 microns, and fine particles comprising polymethyl methacrylate or silicon dioxide are particularly preferred.

The photographic sensitive material of this invention may contain a color coupler.

A photographic emulsion for use in a photographic sensitive material to which the polymer of this invention is applied may contain one or more surfactants. Surfactants are primarily used as a coating aid, but they are sometimes used for other purposes such as for effective dispersion, sensitization, improvement of the photographic characteristics, and to confer antistatic and antiblocking properties. These surfactants include natural surfactants such as saponin; nonionic surfactants such as alkylene oxide-, glycerin- and glycidol-based compounds; cationic surfactants such as higher alkylamines, quaternary ammonium salts, pyridine and other heterocyclic compounds, phosphoniums or sulfoniums; anionic surfactants containing carboxylic acid, sulfonic acid, phosphoric acid, acidic groups such as a sulfate ester group and a phosphate ester group; and amphoteric surfactants such as amino acids, aminosulfonic acids, and sulfate or phosphate ester of aminoalcohol.

For use of this invention for gelatin to be used in a silver halide photosensitive material, reference is made to *Research Disclosure,* Vol. 176, pp. 22–28 (1978) for the preparation and use of the silver halide, chemical sensitizers, antifoggants, spectral sensitizing dyes, polymer latexes, matting agents, brightening agents, surfactants, plasticizers, lubricants, antistatic agents and supports.

According to this invention, each layer of a photographic sensitive material can be applied by any of various known coating methods such as dip coating, air knife coating, curtain coating, spray coating, and extrusion coating that uses a hopper as described in U.S. Pat. No. 2,681,294. If desired, two or more layers can be applied at the same time according to a method as described, for example, in U.S. Pat. Nos. 2,761,791, 3,508,947, 2,941,898 and 3,526,528.

There is no particular limitation on the method of exposing and developing a photographic sensitive material that contains polymer according to the invention, and methods such as those described in *Research Disclosure,* Vol. 176, pp. 28–30 (1978) can be used.

The monomers used to prepare the benzenesulfinic acid containing polymers used in this invention can be synthesized by the following illustrative methods, but the invention is not limited to these examples.

I. Synthesis of sodium salt of vinyl benzenesulfinic acid (Compound A)

I-1. Synthesis of p-(β-bromomethylbenzene)sulfonyl chloride

A measured amount (84.3 g) of 30% fuming sulfuric acid was placed in a three-necked flask with a stirrer, and at a controlled temperature of 20° to 23° C., a mixture of 58.8 g (0.32 mol) of commerical β-bromoethylbenzene and 26.1 g of acetonitrile (0.636 mol) was added to the flask dropwise. Thereafter, the temperature of the reaction mixture was elevated to from 40° C. to 45° C., at which 92.3 g (0.795 mol) of chlorosulfonic acid was added dropwise. Following the dropwise addition, the reaction mixlture was held at from 40° C. to 45° C. for a while until the reaction was terminated. The reaction mixture was poured into one liter of ice water, and the resulting crystal was filtered off, dried, and recrystallized from hexane. The desired compound having a melting point of 54°–55° C. was obtained in a yield of 59%.

I-2. Synthesis of p-(β-bromoethylbenzene)sulfinic acid

A measured amount (42.5 g) (0.15 mol) of the p-(β-bromoethylbenzene)sulfonyl chloride and 210 cc of glacial acetic acid were placed in a 500-cc three-necked flask, and under stirring, 12.8 g of zinc powder was added to the flask at from 25° C. to 35° C. Thereafter, the mixture was stirred for one hour at 35° C., and after the addition of 128 ml of concentrated hydrochloric acid and 106 ml of water, the temperature of the reaction mixture was elevated to about 80° C. When the content was dissolved completely, the reaction mixture was cooled with ice, and the resulting crystal was filtered off and recrystallized from water. The desired compound having a melting point of 105°-107° C. was obtained in a yield of 42%.

I-3. Synthesis of sodium salt of vinylbenzenesulfinic acid (Compound A)

A mixture of 12.7 g (0.051 mol) of the 2-bromoethyl benzenesulfinic acid, 10.0 g (0.153 mol) of caustic potash, 237 ml of methanol and 0.14 g of hydroquinone was placed in a 500-cc three-necked flask and heated under reflux for one hour. Thereafter, the methanol was evaporated to obtain a solid which was mixed with 80 ml of water and 9 ml of concentrated hydrochloricacid. The resulting mixture was cooled with ice, and the crystal of vinylbenzenesulfinic acid was filtered off, dissolved in water, neutralized with caustic soda, and the water was distilled off to obtain Compound A (yield: 60%), having a melting point of at least 200° C.

II. Synthesis of sodium p-(α-methylvinyl)benzenesulfinate (Compound C)

α-methylstyrene was treated with chlorosulfonic acid in a manner analogous to Synthesis I-1, to prepare p-(α-methylvinyl)benzenesulfonyl chloride. The chloride was reduced in the same manner as in Synthesis I-2, and neutralized with caustic soda to obtain sodium p-(α-methylvinyl)benzenesulfinafte (yield: 36%) having a melting point of at least 200° C.

III. Synthesis of sodium vinylbenzene-2,4-disulfinate (Compound E)

Compound E can be synthesized by a method that as described in *Trudy, Vsesoyuznyi Nauchno-Issledovatel'skii Institut Khimicheskikh Reaktivovi Osobo Chistykh Khimicheskikh Veshchestv*, No. 33, p. 157.

The polymer can achieve the intended objects of this invention whether it is used as a solution in water or organic solvent or dispersion in water.

As already mentioned, the polymer having a repeating unit of the formula (I) can be prepared by polymerizing a monomer of formula (II) or by introducing a sulfinic group into a separately prepared polymer. For example, a chlorosulfonated polystyrene can be prepared from polystyrene or poly(α-methylstyrene) in the manner of Synthesis I-1, and a polystyrene having a sulfinic group in the benzene nucleus can be produced in the manner of Synthesis I-2, as described above.

SYNTHESIS EXAMPLE 1

Synthesis of Compound (P-1)

A mixture of 30.0 g of sodium salt of vinylbenzenesulfinic acid and 1.5 g of potassium persulfate was dissolved in 300 cc of distilled water and the mixture in aqueous solution was polymerized in a nitrogen stream at 70° C. for 24 hours. Thereafter, the aqueous solution was dialyzed with distilled water for 24 hours, and then freeze-dried. The yield of the polymer (P-1) was 22.6 g. It had an intrinsic viscosity $n_{sp}/c$ (c=0.2 wt %) of 1.388 in a 1.5 mol aqueous solution of sodium bromide.

SYNTHESIS EXAMPLE 2

Synthesis of Compound (P-4)

A mixture of 10.0 g of sodium salt of vinylbenzenesulfinic acid, 5.83 g of N-vinylpyrrolidone and 0.570 g of the hydrochloride of 2,2'-azobis(2-amidinopropane) was dissolved in 200 cc of distilled water and subjected to polymerization in the same manner as in Synthesis Example 1. The desired compound (P-4) was obtained in a yield of 16.0 g.

SYNTHESIS EXAMPLE 3

Synthesis of Compound (P-7)

A mixture of 15.0 g of sodium salt of vinylbenzenesulfinic acid, 5.8 g of potassium salt of vinylbenzenesulfonic acid and 0.570 g of the hydrochloride of 2,2'-azobis(2-amidinopropane) was dissolved in 200 cc of distilled water, and polymerization was performed in the same manner as in Synthesis Example 1. The yield of the polymer (P-7) was 19.9 g. It had an intrinsic viscosity $n_{sp}/c$ (c×0.2 wt %) of 1.850 in a 1.5 mol aqueous solution of sodium bromide.

The method of the present invention can be used with advantage not only in photographic light-sensitive materials as described above, but also in any other technical field which requires hardening of gelatin, such as in forming microcapsules for pressure-sensitive copying paper.

This invention is hereunder described in greater detail by reference to the following examples that illustrate the application of the invention to silver halide photographic light-sensitive material, but it should be understood that the scope of this invention is not limited to such examples.

EXAMPLE 1

An aqueous gelatin solution obtained by adding 1,3-bis(vinylsulfonyl)-2-hydroxypropane (Compound (V-1)) to a 10% aqueous gelatin solution in an amount of 1.2 g per 100 g of dry gelatin was divided into eight equal portions. One of them was set aside as a control. To another four portions the polymer compound (P-1) was added in an amount of 4% by weight of dry gelatin, respectively; to three portions thereof there were further added ethylene glycol, glycerol, and trimethylol propane, respectively, in an amount of 3% by weight of dry gelatin. To the remaining three portions there were added ethylene glycol, glycerol, and trimethylol propane, respectively, in an amount of 3% by weight of dry gelatin. These eight gels in solutions were uniformly coated on a subbed cellulose tricacetate support in a dry thickness of 6 microns, and dried to prepare Samples 1 to 8, as indicated in Table 1 below. These samples were allowed to stand while being maintained at 25° C. and 50% RH (relative humidity), and, at 1, 3, 7, 15 and 30 darys after coating, the samples were measured for the swelling ratio (Q) in water at 25° C. determined according to the following formula:

$$Q = \frac{\text{Increase in film thickness upon swelling}}{\text{Thickness of dry film}}$$

The results thus obtained are shown in Table 1 below.

TABLE 1

| Sample No. | Gelatin Hardener | Polyvalent Alcohol | Polymer | Swelling Ratio (Q) Days after Coating 1 | 3 | 7 | 15 | 30 |
|---|---|---|---|---|---|---|---|---|
| 1 | Compound (V-1) | — | — | 6.9 | 4.8 | 4.0 | 3.1 | 2.8 |
| 2 | " | — | Compound (P-1) | 5.1 | 4.0 | 3.7 | 3.3 | 3.2 |
| 3 | " | Ethylene Glycol | — | 5.8 | 4.5 | 3.8 | 3.1 | 2.7 |
| 4 | " | Glycerol | — | 5.8 | 4.4 | 3.5 | 3.0 | 2.6 |
| 5 | " | Trimethylol Propane | — | 6.1 | 4.7 | 3.9 | 3.3 | 2.8 |
| 6 (Present Invention) | " | Ethylene Glycol | Compound (P-1) | 4.3 | 3.6 | 3.4 | 3.3 | 3.3 |
| 7 (Present Invention) | " | Glycerol | " | 4.0 | 3.3 | 3.1 | 3.1 | 3.1 |
| 8 (Present Invention) | " | Trimethylol Propane | " | 4.5 | 3.8 | 3.5 | 3.3 | 3.3 |

As is apparent from the results shown in Table 1, by the use in combination of the polymer compound (P-1) and the polyvalent alcohol the rate of hardening gelatin is remarkably increased and the post hardening property is also improved in comparison with the cases in which the polymer compound or the polyvalent alcohol is used alone.

EXAMPLE 2

Certain samples obtained in Example 1 (Sample Nos. 1, 2, 6 and 8) were allowed to stand while being maintained at 25° C. and humidity conditions of 50% RH, 65% RH, and 80% RH for 1 day, 7 days and 30 days. Each sample was measured for the swelling ratio (Q) in water at 25° C. The results thus obtained are shown in Table 2 below.

TABLE 2

| Sample No. | Sample | Humidity during Storage | Swelling Ratio (Q) 1 Day | 7 Days | 30 Days |
|---|---|---|---|---|---|
| | | 50% RH | 6.9 | 4.0 | 2.8 |
| 1 | Hardener Compound (V-1) | 65 | 6.0 | 3.0 | 2.5 |
| | | 80 | 4.0 | 2.2 | 2.0 |
| 2 | Hardener Compound (V-1) | 50 | 5.1 | 3.7 | 3.2 |
| | Polymer Compound (P-1) | 65 | 4.2 | 3.2 | 2.9 |
| | | 80 | 3.8 | 2.8 | 2.7 |
| | Hardener Compound (V-1) | 50 | 4.3 | 3.4 | 3.3 |
| 6* | Polymer Compound (P-1) | 65 | 3.5 | 3.3 | 3.2 |
| | Ethylene Glycol | 80 | 3.3 | 3.2 | 3.2 |
| | Hardener Compound (V-1) | 50 | 4.5 | 3.5 | 3.3 |
| 8* | Polymer Compound (P-1) | 65 | 3.7 | 3.2 | 3.1 |
| | Trimethylol Propane | 80 | 3.4 | 3.1 | 3.0 |

*Present Invention

As is apparent from the results shown in Table 2, by the use of the polymer compound (P-1) and the polyvalent alcohol in a combination, the change in final hardness of gelatin is very small and thus the dependency on humidty during storage is remarkably improved in comparison with the cases in which only the polymer compound or the polyvalent alcohol is used.

EXAMPLE 3

On a cellulose triacetate film having a subbing layer, layers were coated having the compositions shown below in the order listed from the support side to prepare Samples 11 to 18. In each layer of each sample, the hardener, the polyvalent alcohol and the polymer according to the present invention were incorporated as shown in Table 3 below.

Layer-1. Antihalation layer wherein black colloidal silver was dispersed in gelatin (dry thickness: 2.0 microns).

Layer-2. Gelatin interlayer (dry thickness: 1.0 micron).

Layer-3. Red-sensitive silver halide emulsion layer having a low sensitivity: A silver iodobromide emulsion containing 5 mol% of iodine (having an average grain size of 0.3μ, and containing 100 g of silver halide and 70 g of gelatin per 1 kg of the emulsion) was prepared in a conventional manner. To a 1 kg portion of this emulsion, 210 cc of a 0.1% methanol solution of anhydro-5,5-dichloro-9-ethyl-3,3'-di(3-sulfopropyl)-thiacarbocyanine hydroxide pyridinium salt was added as a red-sensitive spectral sensitizer and subsequently, 20 cc of a 5 wt % aqueous solution of 5-methyl-7-hydroxy-2,3,4-triazaindolizine, 400 g of a cyan coupler emulsion (1) having the formula described below, and 200 g of an emulsion (2) having the formula described below, followed by the addition of 200 cc of a 2% aqueous solution of colored cyan coupler (CC-1) having the structural formula described below. The thus obtained red-sensitive silver halide emulsion solution having a low sensitivity was coated in a dry thickness of 3.5 microns.

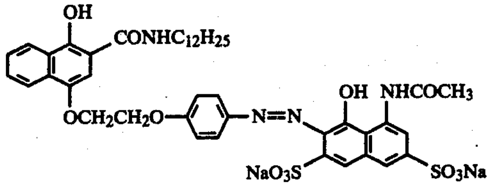

CC-1

Emulsion (1)

| | | |
|---|---|---|
| (1) | 10 wt % aqueous solution of gelatin | 1,000 g |
| (2) | Sodium p-dodecylbenzenesulfonate | 5 g |
| | Tricresyl phosphate | 60 cc |
| | Cyan coupler (C-101) | 70 g |
| | Ethyl acetate | 100 cc |

The mixture (2) was heated at 55° C. to form a solution. The resulting solution was added to (1), which had been previously warmed to 55° C., and emulsified using a colloid mill.

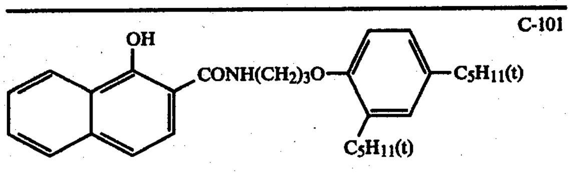

C-101

-continued

Emulsion (2)

| | | | |
|---|---|---|---|
| (1) | 10 wt % aqueous solution of gelatin | 1,000 | g |
| (2) | Sodium p-dodecylbenzenesulfonate | 5 | g |
| | Tricresyl phosphate | 60 | cc |
| | Cyan coupler (C-101) | 70 | g |
| | DIR (development inhibitor releasing) compound (D-1) | 10 | g |
| | Ethyl acetate | 100 | cc |

The mixture (2) was heated at 55° C. to form a solution. The resulting solution was added to (1), which had been previously warmed to 55° C., and emulsified using a colloid mill.

D-1

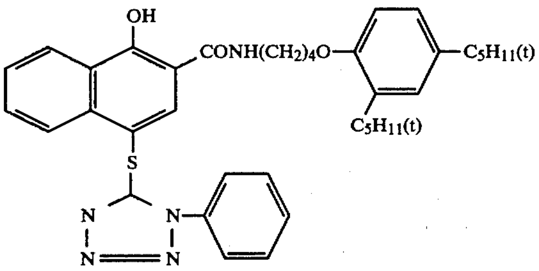

Layer-4. Red-sensitive silver halide emulsion layer having a high sensitivity: A silver halide emulsion solution was prepared in the same manner as in Layer-3, except that the average grain size of emulsion was altered to 0.9 micron, the addition amount of the methanol solution of the red-sensitive spectral sensitizer was altered to 140 cc, the addition amount of the emulsion (1) was altered to 220 g, the addition amount of the emulsion (2) was altered to 30 g. The silver halide emulsion solution thus obtained was coated in a dry thickness of 2.2 microns.

Layer-5. Gelatin interlayer (dry thickness: 0.8 micron)

Layer-6. Green-sensitive silver halide emulsion layer having a low sensitivity: To a 1 kg of the silver iodobromide emulsion employed in Layer-3, there were added 180 cc of 0.1% methanol solution of 3,3'-di(2-sulfoethyl)-9-ethylbenzoxacarbocyanine pyridinium salt as a green-sensitive sensitizing dye, and 20 cc of a 5 wt % aqueous solution of 5-methyl-7-hydroxy-2,3,4-triazaindolizine, in this order. Further, 320 g of a magenta coupler emulsion (3) having the formula described below, 180 g of the magenta coupler emulsion (4) having the formula described below were added thereto. The thus obtained green-sensitive silver halide emulsion solution having a low sensitivity was coated in a dry thickness of 3.2 microns.

Layer-7. Green-sensitive silver halide emulsion layer having a high sensitivity: A silver halide emulsion solution was prepared in the same manner as in Layer-6, except that the average grain size of emulsion was altered to 1.0 micron, the iodine content in the emulsion to 6.5 mol%, the addition amount of the methanol solution of the green-sensitive spectral sensitizer to 100 cc, the addition amount of the emulsion (3) to 150 g, the addition amount of the emulsion (4) to 30 g. The silver halide emulsion solution thus obtained was coated in a dry thickness of 2.2 microns.

Emulsion (3)

| | | | |
|---|---|---|---|
| (1) | 10 wt % aqueous solutions of gelatin | 1,000 | g |
| (2) | Sodium p-dodecylbenzenesulfonate | 5 | g |
| | Tricresyl phosphate | 80 | cc |
| | Magenta coupler (M-101) | 50 | g |
| | Colored magenta coupler (CM-1) | 10 | g |
| | Ethyl acetate | 120 | cc |

The mixture (2) was heated at 55° C. to form a solution. The resulting solution was added to (1), which had been previously warmed to 55° C., and emulsified using a colloid mill.

M-101

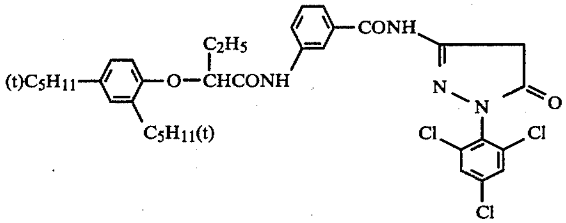

CM-1

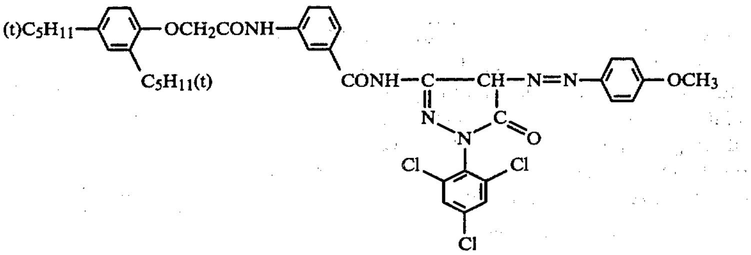

Emulsion (4)

| | | | |
|---|---|---|---|
| (1) | 10 wt % aqueous solution of gelatin | 1,000 | g |
| (2) | Sodium p-dodecylbenzenesulfonate | 5 | g |
| | Tricresyl phosphate | 80 | cc |
| | Magenta coupler (M-101) | 50 | g |
| | Colored magenta coupler (CM-1) | 10 | g |
| | DIR compound (D-2) | 15 | g |

-continued

| | |
|---|---|
| Ethyl acetate | 120 cc |

The mixture (2) was heated to 55° C. to form a solution. The resulting solution was added to (1), which had been previously warmed to 55° C. and emulsified using a colloid mill.

D-2

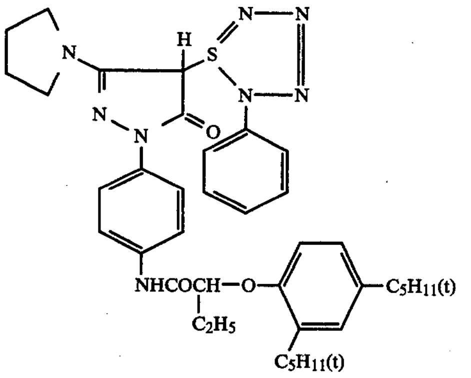

Layer-8. Yellow colloidal silver layer (dry thickness: 1.6 microns).

Layer-9. Blue-sensitive silver halide emulsion layer having a low sensitivity: To 1 kg of the same silver iodobromide emulsion as employed in Layer-3, except that the average grain size was 0.5 microns, were added 20 cc of a 5 wt % aqueous solution of 5-methyl-7-hydroxy-2,3,4-triazaindolizine and 1,500 g of the yellow coupler emulsion (5) prepared according to the formula described below. The blue-sensitive silver halide emulsion solution having a low sensitivity thus obtained was coated in a dry thickness of 3.0 microns.

| Emulsion (5) | | |
|---|---|---|
| (1) | 10 wt % aqueous solution of gelatin | 1,000 g |
| (2) | Sodium p-dodecylbenzenesulfonate | 5 g |
| | Tricresyl phosphate | 80 cc |
| | Yellow coupler (Y-1) | 100 g |
| | Ethyl Acetate | 120 cc |

The mixture (2) was heated to 55° C. to form a solution. The resulting solution was added to (1), which had been previously warmed to 55° C., and emulsified using a colloid mill.

Y-1

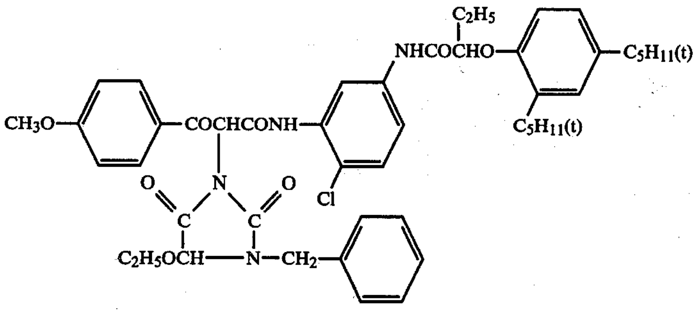

Layer-10. Blue-sensitive silver halide emulsion layer having a high sensitivity: A silver halide emulsion solution was prepared in the same manner as in Layer-9 except that the average grain size of the emulsion was altered to 1.1 microns, the addition amount of the emulsion (5) to 300 g. The silver halide emulsion solution thus obtained was coated in a dry thickness of 2.5 microns.

Layer-11. Gelatin protective layer (dry thickness: 1.5 microns).

TABLE 3

| | Sample No. | | | | | | | |
|---|---|---|---|---|---|---|---|---|
| Layer | 11 | 12 | 13 | 14 (Present Invention) | 15 | 16 | 17 | 18 (Present Invention |
| 1 | — | — | — | — | — | — | — | — |
| 2 | — | — | — | — | — | — | — | — |
| 3 | — | — | Polymer (P-2) was added | Polymer (P-2) was added | — | — | Polymer (P-2) was added | Polymer (P-2) was added |
| 4 | — | — | Polymer (P-2) was added | Polymer (P-2) was added | — | — | Polymer (P-2) was added | Polymer (P-2) was added |
| 5 | — | Ethylene glycol was added | — | Ethylene glycol was added | — | Ethylene glycol was added | — | Ethylene glycol was added |
| 6 | — | — | Polymer (P-2) was added | Polymer (P-2) was added | — | — | Polymer (P-2) was added | Polymer (P-2) was added |
| 7 | — | — | Polymer (P-2) was added | Polymer (P-2) was added | — | — | Polymer (P-2) was added | Polymer (P-2) was added |
| 8 | — | Ethylene glycol was added | — | Ethylene glycol was added | — | Ethylene glycol was added | — | Ethylene glycol was added |

TABLE 3-continued

| | Sample No. | | | | | | | |
|---|---|---|---|---|---|---|---|---|
| Layer | 11 | 12 | 13 | 14 (Present Invention) | 15 | 16 | 17 | 18 (Present Invention |
| 9 | — | — | Polymer (P-2) was added | Polymer (P-2) was added | — | — | Polymer (P-2) was added | Polymer (P-2) was added |
| 10 | — | — | Polymer (P-2) was added | Polymer (P-2) was added | — | — | Polymer (P-2) was added | Polymer (P-2) was added |
| 11 | Hardener (V-7) was added | Hardener (V-7) was added | Hardener (V-7) was added | Hardener (V-7) was added | Hardener (V-1) was added | Hardener (V-1) was added | Hardener (V-1) was added | Hardener (V-1) was added |

Amount added:
Hardener (V-7): 2 wt % of the total solid gelatin contained in all layers.
Hardener (V-1): 1.2 wt % of the total solid gelatin contained in all layers.
Polymer (P-2): 2 wt % of the solid gelatin in a layer to be added.
Ethylene glycol: 5 wt % of the total solid gelatin contained in all layers (the amount was the sum contained in layers 5 and 8 and layers 5 and 8 contain equal amounts of ethylene glycol).

With respect to Sample Nos. 11 to 18 prepared as described above, the following tests 1 and 2 were carried out.

Test 1: Measurement of Degree of Swelling:

The degree of swelling was measured in water at 25° C.

$$\text{Degree of Swelling} = \frac{\text{Thickness of dry film} + \text{Thickness of swelling}}{\text{Thickness of dry film}}$$

Test 2

The sample was exposed through a step wedge and processed in the manner as described below. Then the sensitivity of the sample was determined. In Table 4, the number of days required for the sensitivity to reach a constant value is shown. In Table 5, the relative sensitivity of the blue-sensitive layer (the sensitivity of the sample which had been stored at 70% RH being taken as 100) and the degree of swelling of the emulsion layer when the hardening reaction almost completely finished after the coating (after aging for two months) are set forth.

| Processing Step | Temperature (°C.) | Time (min) |
|---|---|---|
| Color development | 38 | 3 |
| Water-washing | " | 1 |
| Bleaching | " | 2 |
| Water-washing | " | 1 |
| Fixing | " | 2 |
| Water-washing | " | 1 |
| Stabilizing | " | 1 |

The compositions of the processing solutions used in the above steps were as follows:

| | |
|---|---|
| Color Developer | |
| Sodium hydroxide | 2 g |
| Sodium sulfite | 2 g |
| Potassium bromide | 0.4 g |
| Sodium chloride | 1 g |
| Borax | 4 g |
| Hydroxylamine sulfate | 2 g |

-continued

| | |
|---|---|
| Disodium ethylenediaminetetraacetate | 2 g |
| 4-Amino-3-methyl-N—ethyl-N—(β-hydroxyethyl)aniline monosulfate | 4 g |
| Water to make | 1 l |
| Bleaching Solution | |
| Iron (III) sodium ethylenediamine-tetraacetate ($2H_2O$) | 100 g |
| Potassium bromide | 50 g |
| Ammonium nitrate | 50 g |
| Boric acid | 5 g |
| Ammonia water | adjust to pH = 5.0 |
| Water to make | 1 l |
| Fixing Solution | |
| Sodium thiosulfate | 150 g |
| Sodium sulfite | 15 g |
| Borax | 12 g |
| Glacial acetic acid | 15 ml |
| Potash alum | 20 g |
| Water to make | 1 l |
| Stabilizing Solution | |
| Boric acid | 5 g |
| Sodium citrate | 5 g |
| Sodium metaborate ($4H_2O$) | 3 g |
| Potash alum | 15 g |
| Water to make | 1 l |

TABLE 4

| | Sample No. | | | | | | | |
|---|---|---|---|---|---|---|---|---|
| Storage Conditions after Coating | 11 | 12 | 13 | 14 (Present Invention) | 15 | 16 | 17 | 18 (Present Invention) |
| 25° C., 50% RH | 11 days | 8 | 9 | 2 | 20 | 15 | 15 | 2–3 |
| 25° C., 60% RH | 6 | 4 | 5 | 1 | 15 | 10 | 11 | 1–2 |
| 25° C., 70% RH | 3 | 2–3 | 2–3 | 1 | 7 | 5 | 5 | 1 |

As is apparent from the results shown in Table 4, when Compound (V-1) or (V-7) was used as a hardener and Polymer (P-2) and ethylene glycol were used together as accelerators, the effect of accelerating hardening and the effect of making the dependency of hardening proceeding on humidity during storage small are super-additively increased in comparison with the cases wherein Polymer (P-2) or ethylene glycol was used individually.

TABLE 5

| Storage Conditions after Coating | 11 | | 12 | | 13 | | (Present Invention) | |
|---|---|---|---|---|---|---|---|---|
| | Degree of Swelling | Relative Sensitivity | Degree of Swelling | Relative Sensitivity | Degree of Swelling | Relative Sensitivity | Degree of Swelling | Relative Sensitivity |
| 25° C., 50% RH | 2.81 | 117 | 2.77 | 113 | 2.78 | 113 | 2.68 | 102 |
| 25° C., 60% RH | 2.74 | 112 | 2.72 | 110 | 2.72 | 110 | 2.66 | 100 |
| 25° C., 70% RH | 2.60 | 100 | 2.61 | 100 | 2.63 | 100 | 2.65 | 100 |

| Storage Conditions after Coating | 15 | | 16 | | 17 | | 18 (Present Invention) | |
|---|---|---|---|---|---|---|---|---|
| | Degree of Swelling | Relative Sensitivity | Degree of Swelling | Relative Sensitivity | Degree of Swelling | Relative Sensitivity | Degree of Swelling | Relative Sensitivity |
| 25° C., 50% RH | 2.90 | 126 | 2.85 | 118 | 285 | 119 | 2.70 | 103 |
| 25° C., 60% RH | 2.81 | 117 | 2.79 | 115 | 2.78 | 115 | 2.68 | 101 |
| 25° C., 70% RH | 2.63 | 100 | 2.64 | 100 | 2.64 | 100 | 2.65 | 100 |

From the results shown in Table 5 it is apparent that the dependency of the final hardness of layer (which corresponds to the final sensitivity) on the humidity during storage is super additively small by using polymer (P-2) together with ethylene glycol in comparison with the cases the polymer or ethylene glycol was used individually. The relative sensitivities to the green-sensitive layer and the red-sensitive layer were almost same results as those of the blue-sensitive layer shown in Table 5.

EXAMPLE 4

Coated Sample Nos. 19 to 22 were prepared in the manner as shown in Example 3 except that the factors set forth in Table 6 were altered, respectively.

TABLE 6

| Layer | Sample No. 19 | 20 | 21 | 22 (Present Invention) |
|---|---|---|---|---|
| 1 | — | — | — | — |
| 2 | — | — | — | — |
| 3 | — | — | Polymer (P-7) was added | Polymer (P-7) was added |
| 4 | — | — | Polymer (P-7) was added | Polymer (P-7) was added |
| 5 | — | Trimethylol propane was added | — | Trimethylol propane was added |
| 6 | — | — | Polymer (P-7) was added | Polymer (P-7) was added |
| 7 | — | — | Polymer (P-7) was added | Polymer (P-7) was added |
| 8 | — | Trimethylol propane was added | — | Trimethylol propane was added |
| 9 | — | — | Polymer (P-7) was added | Polymer (P-7) was added |
| 10 | — | — | Polymer (P-7) was added | Polymer (P-7) was added |
| 11 | Hardener (V-41) was added | Hardener (V-41) was added | Hardener (V-41) was added | Hardener (V-41) was added |

Amount Added:

Hardener (V-41): 1.2 wt% of the total solid gelatin contained in all layers.

Polymer (P-7): 2 wt % of the solid gelatin in the layer to which added.

Trimethylol Propane: 5 wt % of the total solid gelatin contained in all layers (the amount was the sum contained in layers 5 and 8 and trimethylolpropane was used in equal amounts in layers 5 and 8).

The samples thus obtained were subjected to the same tests as described in Example 3. The results obtained are shown in Table 7 below.

TABLE 7

| Storage Conditions after Coating | Sample No. 19 A | 19 B | 19 C | 20 A | 20 B | 20 C | 21 A | 21 B | 21 C | 22 (Present Invention) A | 22 B | 22 C |
|---|---|---|---|---|---|---|---|---|---|---|---|---|
| 25° C., 50% RH | 31 | 3.12 | 146 | 26 | 3.02 | 135 | 28 | 3.05 | 140 | 18 | 2.82 | 118 |
| 25° C., 60% RH | 26 | 3.03 | 135 | 22 | 2.94 | 128 | 23 | 2.96 | 130 | 13 | 2.76 | 114 |
| 25° C., 70% RH | 15 | 2.65 | 100 | 10 | 2.63 | 100 | 11 | 2.66 | 100 | 4 | 2.66 | 100 |

A: The number of days required for the sensitivity to reach aconstant value.
B: Final degree of swelling.
C: Final relative sensitivity of the blue-sensitive layer.

As is apparent from the results shown in Table 7, the same effects as those of Example 3 were obtained.

While the invention has been described in detail and with reference to specific embodiments thereof, it will be apparent to one skilled in the art that various changes and modifications can be made therein without departing from the spirit and scope thereof.

What is claimed is:

1. A method of hardening gelatin which uses (1) a polymer containing at least 0.01 mol% of a repeating unit represented by formula (I)

(I)

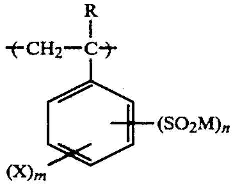

wherein R represents a hydrogen atom, an alkyl group having from 1 to 6 carbon atoms, or a halogen atom, M represents a hydrogen atom, an alkali metal atom, an alkaline earth metal atom, or an organic base, X represents an alkyl group having from 1 to 6 carbon atoms, an alkoxy group having from 1 to 6 carbon atoms, an alkylamino group having from 1 to 6 carbon atoms, or a halogen atom, m represents 0, 1 or 2, and n represents 1 or 2, (2) a polyvalent alcohol having at least two hydroxy groups, and (3) a hardener having an active vinyl group.

2. A method of hardening gelatin as in claim 1, wherein R represents a hydrogen atom.

3. A method of hardening gelatin as in claim 1, wherein the alkyl group represented by R is a methyl group or an ethyl group.

4. A method of hardening gelatin as in claim 1, wherein the halogen atom represented by R is a chlorine atom or a bromine atom.

5. A method of hardening gelatin as in claim 1, wherein M represents a hydrogen atom.

6. A method of hardening gelatin as in claim 1, wherein M represents a sodium atom or a potassium atom.

7. A method of hardening gelatin as in claim 1, wherein M represents a calcium atom or a magnesium atom.

8. A method of hardening gelatin as in claim 1, wherein M represents trimethylamine or triethylamine.

9. A method of hardening gelatin as in claim 1, wherein R is a hydrogen atom, m is 0 and n is 1.

10. A method of hardening gelatin as in claim 1, wherein said polymer is a homopolymer.

11. A method of hardening gelatin as in claim 1, wherein said polymer is a copolymer.

12. A method of hardening gelatin as in claim 11, wherein said copolymer contains a repeating unit derived from a monomer having at least one addition polymerizable unsaturated bond.

13. A method of hardening gelatin as in claim 12, wherein said monomer is an allyl ester, a vinyl ether, a vinyl ester, a vinyl heterocyclic compound, a styrene, a crotonic acid, a vinyl ketone, an olefin or an itaconic acid.

14. A method of hardening gelatin as in claim 11, wherein said copolymer contains at least 0.01 mol% of the repeating unit of formula (I).

15. A method of hardening gelatin as in claim 1, wherein said polymer is present in an amount of from 0.01 to 99 wt % based on the total amount of gelatin and polymer.

16. A method of hardening gelatin as in claim 1, wherein said polymer has a number average molecular weight of from 1,000 to 2,000,000.

17. A method of hardening gelatin as in claim 1, wherein said polyvalent alcohol is a saturated alcohol containing from 2 to 12 hydroxy groups and 2 to 20 carbon atoms.

18. A method of hardening gelatin as in claim 1, wherein said polyvalent alcohol is present in an amount of from 0.1 to 50 wt % based on the amount of dry gelatin.

19. A method of hardening gelatin as in claim 1, wherein said hardener is present in an amount of from about 0.01 to 20 wt % based on the amount of dry gelatin.

20. A method of hardening gelatin as in claim 1, wherein said gelatin is a gelatin contained in a layer of a silver halide photographic light-sensitive material.

21. A method of hardening gelatin as in claim 20, wherein said layer is a silver halide emulsion layer, a surface protective layer, an interlayer, a filter layer, an antihalation layer, a subbing layer or a backing layer.

22. A method of hardening gelatin as in claim 12, wherein the monomer containing at least one addition polymerizable unsaturated bond is a styrene, vinyl heterocyclic compound, vinyl ether, vinyl ester, or olefin.

23. A method of hardening gelatin as in claim 15, wherein said polymer is present in an amount of from 0.1 to 50 wt %.

24. A method of hardening gelatin as in claim 15, wherein said polymer is present in an amount of from 1 to 20 wt %.

25. A method of hardening gelatin as in claim 16, wherein said polymer has a number average molecular weight of from 10,000 to 500,000.

26. A method of hardening gelatin as in claim 18, wherein said polyvalent alcohol is present in an amount of from 1 to 20 wt %.

27. A method of hardening gelatin as in claim 19, wherein said hardener is present in an amount of from about 0.1 to 10 wt %.

28. A photographic material containing at least one hardened gelatin-containing layer hardened by the combined use of (1) a polymer containing at least 0.01 mol% of a repeating unit represented by formula (I)

(I)

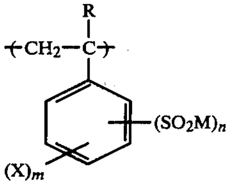

wherein R represents a hydrogen atom, an alkyl group having from 1 to 6 carbon atoms, or a halogen atom, M represents a hydrogen atom, an alkali metal atom, an alkaline earth metal atom, or an organic base, X represents an alkyl group having from 1 to 6 carbon atoms, an alkoxy group having from 1 to 6 carbon atoms, an alkylamino group having from 1 to 6 carbon atoms, or a halogen atom, m represents 0, 1 or 2, and n represents 1 or 2, (2) a polyvalent alcohol having at least two hydroxy group, and (3) a hardener having an active vinyl group.

29. A photographic material as in claim 28, wherein R represents a hydrogen atom.

30. A photographic material as in claim 28, wherein the alkyl group represented by R is a methyl group or an ethyl group.

31. A photographic material as in claim 28, wherein the halogen atom represented by R is a chlorine atom or a bromine atom.

32. A photographic material as in claim 28, wherein M represents a hydrogen atom.

33. A photographic material as in claim 28, wherein M represents a sodium atom or a potassium atom.

34. A photographic material as in claim 28, wherein M represents a calcium atom or a magnesium atom.

35. A photographic material as in claim 28, wherein M represents trimethylamine or triethylamine.

36. A photographic material as in claim 28, wherein R is a hydrogen atom, m is 0 and n is 1.

37. A photographic material as in claim 28, wherein said polymer is a homopolymer.

38. A photographic material as in claim 28, wherein said polymer is a copolymer.

39. A photographic material as in claim 38, wherein said copolymer contains a repeating unit derived from a monomer having at least one addition polymerizable unsaturated bond.

40. A photographic material as in claim 39, wherein said monomer is an allyl ester, a vinyl ether, a vinyl ester, a vinyl heterocyclic compound, a styrene, a crotonic acid, a vinyl ketone, an olefin, or an itaconic acid.

41. A photographic material as in claim 38, wherein said copolymer contains at least 0.01 mol% of the repeating unit of formula (I).

42. A photographic material as in claim 28, wherein said polymer is present in an amount of from 0.01 to 99 wt % based on the total amount of gelatin and polymer.

43. A photographic material as in claim 28, wherein said polymer has a number average molecular weight of from 1,000 to 2,000,000.

44. A photographic material as in claim 28, wherein said polyvalent alcohol is a saturated alcohol containing from 2 to 12 hydroxy group and 2 to 20 carbon atoms.

45. A photographic material as in claim 28, wherein said polyvalent alcohol is present in an amount of from 0.1 to 50 wt% based on the amount of dry gelatin.

46. A photographic material as in claim 28, wherein said hardener is present in an amount of from about 0.01 to 20 wt % based on the amount of dry gelatin.

47. A photographic material as in claim 39, wherein the monomer containing at least one addition polymerizable unsaturated bond is a styrene, vinyl heterocyclic compound, vinyl ether, vinyl ester, or olefin.

48. A photographic material as in claim 42, wherein said polymer is present in an amount of from 0.1 to 50 wt %.

49. A photographic material as in claim 42, wherein said polymer is present in an amount of from 1 to 20 wt %.

50. A photographic material as in claim 43, wherein said polymer has a number average molecular weight of from 10,000 to 500,000.

51. A photographic material as in claim 46, wherein said hardener is present in an amount from about 0.1 to 10 wt %.

52. A photographic material as in claim 45, wherein said polyvalent alcohol is present in an amount of from 1 to 20 wt %.

* * * * *